(12) United States Patent
Soons et al.

(10) Patent No.: US 12,211,190 B2
(45) Date of Patent: Jan. 28, 2025

(54) METHOD AND APPARATUS FOR CONTRAST ENHANCEMENT

(71) Applicant: AGFA NV, Mortsel (BE)

(72) Inventors: Joris Soons, Mortsel (BE); Pieter Vuylsteke, Mortsel (BE)

(73) Assignee: Agfa NV, Mortsel (BE)

( * ) Notice: Subject to any disclaimer, the term of this patent is extended or adjusted under 35 U.S.C. 154(b) by 346 days.

(21) Appl. No.: 17/775,957

(22) PCT Filed: Nov. 12, 2020

(86) PCT No.: PCT/EP2020/081947
§ 371 (c)(1),
(2) Date: May 11, 2022

(87) PCT Pub. No.: WO2021/094471
PCT Pub. Date: May 20, 2021

(65) Prior Publication Data
US 2022/0392029 A1 Dec. 8, 2022

(30) Foreign Application Priority Data

Nov. 14, 2019 (EP) ..................................... 19209050

(51) Int. Cl.
*G06T 5/00* (2024.01)
*G06T 5/94* (2024.01)
(52) U.S. Cl.
CPC ...... *G06T 5/94* (2024.01); *G06T 2207/20012* (2013.01); *G06T 2207/20016* (2013.01); *G06T 2207/30168* (2013.01)
(58) Field of Classification Search
CPC ............. G06T 5/94; G06T 2207/20012; G06T 2207/20016; G06T 2207/30168
See application file for complete search history.

(56) References Cited

U.S. PATENT DOCUMENTS

| | | | |
|---|---|---|---|
| 2008/0137925 A1 | 6/2008 | Bertens et al. | |
| 2008/0205785 A1* | 8/2008 | Geiger | G06T 5/20 |
| | | | 382/254 |
| 2010/0220911 A1* | 9/2010 | Bertens | G06T 5/94 |
| | | | 382/274 |

FOREIGN PATENT DOCUMENTS

| | | |
|---|---|---|
| EP | 2026278 A1 | 2/2009 |
| EP | 2191438 B1 | 8/2019 |

OTHER PUBLICATIONS

Mei et al., "An Improved Multiscale Image Enhancement via Laplacian Pyramid," *Proc. SPIE*, 4875: 402-407 (2002).

(Continued)

*Primary Examiner* — Quang N Vo
(74) *Attorney, Agent, or Firm* — Leydig, Voit & Mayer, Ltd.

(57) ABSTRACT

A multi-scale image processing algorithm for enhancing contrast in an electronic representation of an image represented by a) decomposing said digital image into a set of detail images at multiple resolution levels and a residual image at a resolution level lower than said multiple resolution levels, b) processing at least one pixel of said detail images, c) computing a processed image by applying a reconstruction algorithm to the residual image and the processed detail images, said reconstruction algorithm being such that if it were applied to the residual image and the detail images without processing, then said digital image or a close approximation thereof would be obtained. The processing comprises the steps of: d) calculating for said pixel, at least one statistical measure for two or more translation difference image pixel values within a neighbourhood of said pixel; and e) modifying the value of said pixel of said detail images as a function of said statistical measure and said value of said pixel of said detail images.

20 Claims, 1 Drawing Sheet

(56) References Cited

OTHER PUBLICATIONS

Moulin, "Multiscale Image Decompositions and Wavelets," *The Essential Guide to Image Processing*, Chapter 6, pp. 123-142 (2009).
European Patent Office, International Search Report in International Patent Application No. PCT/EP2020/081947, mailed Feb. 1, 2021, 4 pp.
European Patent Office, Written Opinion in International Patent Application No. PCT/EP2020/081947, mailed Feb. 1, 2021, 7 pp.

* cited by examiner

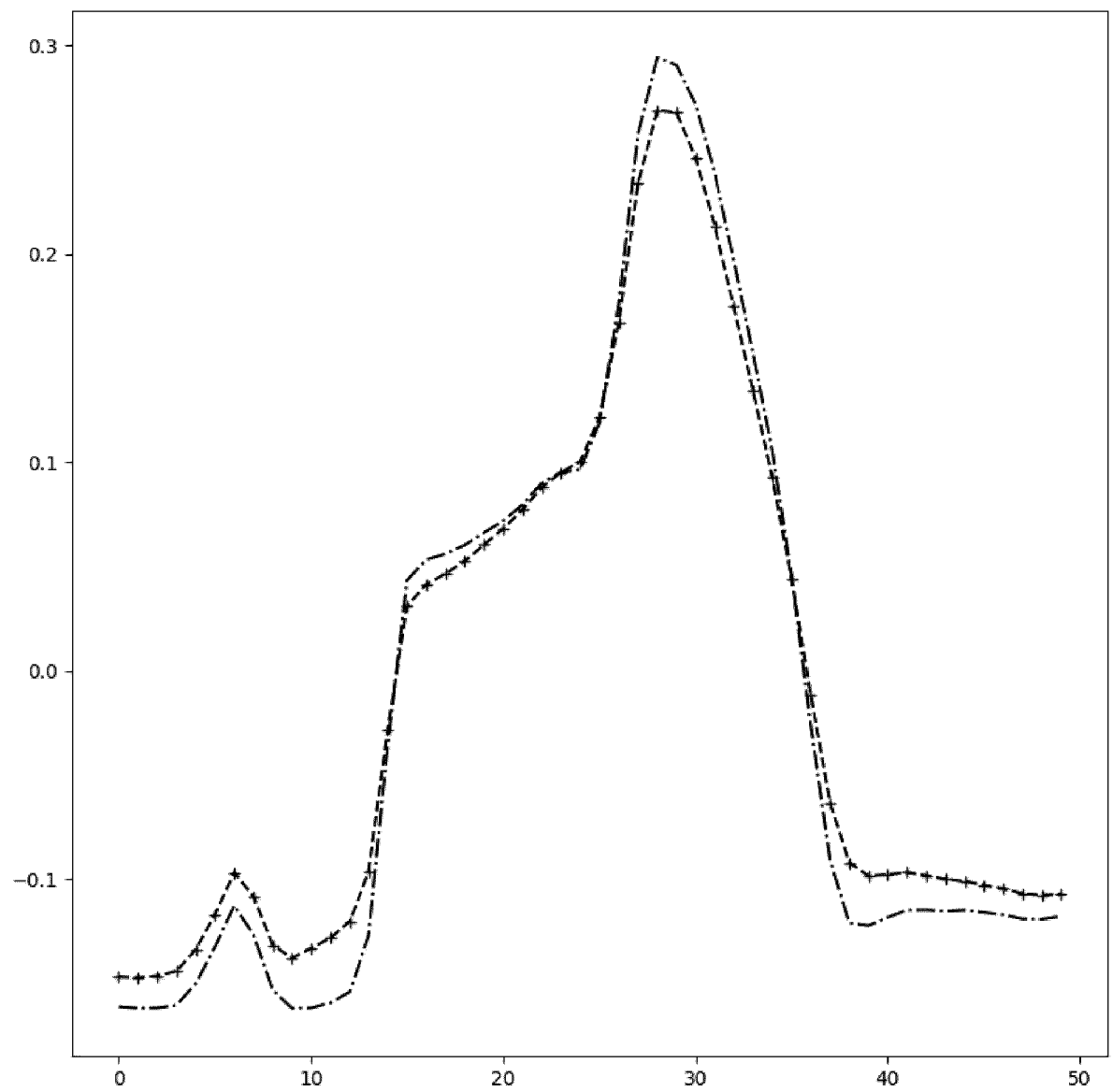

METHOD AND APPARATUS FOR CONTRAST ENHANCEMENT

CROSS-REFERENCE TO RELATED APPLICATIONS

This patent application is the U.S. national phase of International Patent Application No. PCT/EP2020/081947, filed Nov. 12, 2020, which claims the benefit of European Patent Application No. 19209050.4, filed Nov. 14, 2019.

TECHNICAL FIELD

The present invention relates to a method and a system for enhancing the image quality of an image that is represented by a digital signal. More in particular it relates to such method for use in a medical radiographic imaging system, such as a digital radiography system.

BACKGROUND OF THE INVENTION

Commonly images represented by a digital signal such as medical images are subjected to image processing during or prior to displaying or hard copy recording.

The conversion of grey value pixels into values suitable for reproduction or displaying may comprise a multiscale image processing method (also called multi-resolution image processing method) by means of which the contrast of the image is enhanced.

According to such a multi-scale image processing method an image, represented by an array of pixel values, is processed by applying the following steps. First the original image is decomposed into a sequence of detail images at multiple scales and occasionally a residual image. Next, the pixel values of the detail images are modified by applying to these pixel values at least one conversion. Finally, a processed image is computed by applying a reconstruction algorithm to the residual image and the modified detail images.

There are limits for the behaviour of the conversion functions. Grey value transitions in the image can be distorted to an extent that the appearance becomes unnatural if the conversion functions are excessively non-linear. The distortions are more pronounced in the vicinity of significant grey level transitions, which may result in overshoots at step edges and loss of homogeneity in regions of low variance facing strong step edges. The risk of creating artefacts becomes more significant for CT images since they have sharper grey level transitions, e.g. at the interface of soft tissue and contrast media. One has to be careful using the multi-scale techniques on CT images Another multiscale image enhancement algorithm based on Laplacian pyramid (LP) is described in Mei, Tao, et al. "Improved multiscale image enhancement via Laplacian pyramid." Second International Conference on Image and Graphics. Vol. 4875. International Society for Optics and Photonics, 2002. In this method, a multiscale image enhancement algorithm based on Laplacian pyramid (LP) is described. At each scale of the LP, the local variance threshold and relative enhancement are implemented by modifying the detail coefficients of the LP nonlinearly. Therefore a multiplicative scale-relative gain factor $a(i,j)$ is implemented to apply to the pyramid detail coefficients. The objective of the local variance threshold is to emphasize the medium-contrast details of each stage and the objective of relative enhancement is to enhance the details with lower magnitude more than the details with higher magnitude. The variance is calculated as the variance of the approximation images. However, this method still results in distortions for non-linear functions at grey value transitions.

Another multi-scale contrast enhancement algorithm which results in a contrast enhanced image while preserving the shape of the edge transitions has been described in European patent EP1933272.

European application EP 2026278 discloses another multi-scale contrast enhancement algorithm wherein translation difference images are enhanced in order to improve the visualization of a digital medical image. Another European patent EP 2191438 discloses again another multi-scale contrast enhancement algorithm wherein translation difference images are enhanced in order to improve the visualization of a digital medical image, and wherein non-linear modification of the values of said translation difference images is steered by characteristics computed out of said approximation image(s) at at least one scale.

US 2008137925 discloses again another multi-scale contrast enhancement algorithm wherein an enhanced multi-scale detail representation is computed by modifying at at least one scale the detail image according to the amplification image at that scale.

In one embodiment of this method translation difference images of at least one approximation image of the image are created at one or multiple scales. Next, translation difference images are non-linearly modified. Then at least one enhanced center difference image at a specific scale is computed by combining modified translation difference images at that scale or at a smaller scale. Spatially-localized phenomena derived from the image can be used to create enhanced center difference images. Finally, an enhanced image is computed by applying a reconstruction algorithm to the enhanced center difference images.

The advantage of this method over the previous (Mei et al. 2002) is the use of the translation difference images, which are a measurement of elementary contrast in each pixel of an approximation image. This method is, however, disadvantageous since non-linear modification is applied to all translation difference images. Which might result in slow calculation.

It is the object of the present invention to provide a method for enhancing the image quality of an image, and more particularly in digital medical gray scale images. The present invention is advantageous in that it provides a method for enhancing the quality in a digital image so that the appearance remains natural in comparison to other algorithms where the result of the processing may become excessively non-linear, especially near sharp edges or lines, such that the method reduces the distortions in the vicinity of significant grey level transitions.

SUMMARY OF INVENTION

The present invention provides a method for enhancing the contrast in an electronic representation of an original image represented by an array of pixel values by processing said image, said processing comprising the steps of decomposing said digital image into a set of detail images at multiple resolution levels and a residual image at a resolution level lower than said multiple resolution levels, processing at least one pixel of said detail images, computing a processed image by applying a reconstruction algorithm to the residual image and the processed detail images, said reconstruction algorithm being such that if it were applied to the residual image and the detail images without processing, then said digital image or a close approximation thereof would be obtained, and characterized in that said processing comprises the steps of: calculating for said pixel, at least one statistical measure for two or more translation difference image pixel values within a neighborhood of said pixel, and modifying the value of said pixel of said detail images as a function of said statistical measure and said value of said pixel of said detail images.

The invention differs from the state of the art as described in Mei et al 2002 in so far that the modifying of the detail image pixels depends on the calculation of a statistical measure for a translation difference image pixel value, a measure for elementary contrast in each approximation image pixel, as opposed to the local variance of the approximation images itself.

In the context of the present invention, the term "statistical measure for two or more translation difference image pixel values" means "any mathematical operation on the translation difference image pixel value in a neighbourhood of a local approximation image pixel". Therefore, this mathematical operation may for instance be based on the calculation of a local variance, local skewness, kurtosis of such a translation difference image pixel value in an N×N neighbourhood, or any combination of these statistical measures. In another example, this mathematical operation may for instance be based on the interquartile range of translation difference image pixel value in an N×N neighbourhood.

In the context of the present invention, the term "translation difference image pixel value" is defined as any comparison between said approximation image pixel and another approximation image pixel. Therefore, this comparison may for instance be based on the calculation of the difference of the approximation image at that scale and a translated version. Another way to compute this translation difference image pixel value could be the ratio of pixel with a neighbouring pixel, in case the processing steps are preceded by an exponential transform and followed by a log transform.

A statistical measure for two or more translation difference image pixel values has to be understood as any measure or result of a calculation that reflects the amount of elementary contrast that is present in the neighbourhood of the pixel. As an example of such measure, the local variance may be for instance considered. Other statistical measures, such as for instance the difference of a first predetermined percentile value and a second predetermined percentile may also be considered.

The statistical measure for two or more translation difference image pixel values may be computed as the weighted average within a neighborhood of the squared differences between translation difference image pixel values for said approximation image pixel and the detail image pixel value.

$$\text{var}_k(i, j) = \sum_m \sum_n v_{m,n} (g_l(ri, rj) - g_l(ri + m, rj + n) - d_k(ri, rj))^2$$

Alternatively, the statistical measure for two or more translation difference image pixel values may be computed as the weighted average within a neighbourhood of the squared differences between translation difference image pixel values for said approximation image pixel and the detail image pixel value, wherein said detail image pixel value is computed as the weighted average within a neighbourhood of the translation difference image pixel values.

$$\text{var}_k(i, j) = \sum_m \sum_n v_{m,n} \bigg( g_l(ri, rj) - g_l(ri + m, rj + n) - \\ \sum_m \sum_n v_{m,n}(g_l(ri, rj) - g_l(ri + m, rj + n)) \bigg)^2$$

As a result, in this invention, similar results regarding avoidance of distortions as in EP1933272 are obtained, whereas the non-linear enhancement function only has to be applied to one value (the statistical measure for two or more translation difference image pixel values) instead of being applied to all translation difference values separately. This results in a faster computation. Moreover, it provides a better interpretation of the effect of the non-linear function, and thus eases the design of this function.

The above-mentioned aspects are realized by a method, computer program product, and computer readable medium as defined in the appending claims which define the invention. Specific and preferred embodiments of this invention are set out in the dependent claims.

In the context of the present invention specific terms are defined as follows:

Decomposing (decomposition of) a digital image: refers to a multi-scale (or multi-resolution) decomposition of an image which is a process that computes detail images of the image at multiple scales. A multi-scale decomposition mechanism generally involves filter banks for computing the detail images. Well-known techniques are for example: The Laplacian pyramid, the Burt pyramid, the Laplacian stack, the wavelet decomposition and QMF filter banks.

Approximation Image:

An approximation image is a grey value image that represents the original grey value image at the same or a larger scale, or at the same or a lower resolution. An approximation image at a specific scale is equivalent to the original grey value image in which all details at that scale have been omitted (Mallat S. G.,"A Theory for Multiresolution Signal Decomposition: The Wavelet Representation", IEEE Trans. On Pattern Analysis and Machine Intelligence, vol. 11, no. 7, July 1989).

Detail Image:

A detail image is defined as the difference of information between an approximation image at a certain scale and an approximation image at a smaller scale.

Generally, $d_k(i,j)$ represents the detail image pixel value at position i,j in the detail image $d_k$ that is computed as a weighted sum of pixels in the approximation image at the same or smaller scale k,k−1,k−2, . . . :

$$d_k = g_l(ri, rj) - \sum_m \sum_n v_{m,n} g_l(ri + m, rj + n)$$

where with $l \in \{0, \ldots, k\}$ and r=subsampling factor (l−k)

Translation Difference Image:

The translation difference images at a scale/are a measurement of elementary contrast in each pixel of an approximation image at scale s. They can be computed by taking the difference of the approximation image at that scale and a translated version. The translation difference image at a scale/is thus defined as:

$g_l(ri,rj)-g_l(ri+m,rj+n)$

Other computations for elementary contrast are possible, e.g. the ratio of pixel with a neighbouring pixel can be used in case the processing steps are preceded by an exponential transform and followed by a log transform.

Center Difference Image:

A center difference image is computed by applying a combining operator (for example the summation) to translation difference images. The combining operator can be a linear or non-linear function of corresponding pixel values in the translation difference images.

Local Variance of Translation Difference Image Pixel Value:

For each detail image pixel, a local variance of translation difference image pixel value can be calculated by applying a combining operator (for example the summation) to the squared differences between translation difference image pixel values and the detail image pixel values. In other words, the local variance of elementary contrast for a detail image pixel, measures how much the elementary contrast for that pixel are spread out compared to the average elementary contrast value for that pixel.

Conversion Operator

Conversion function generates pixel-wise modification of the detail pixel values as an intermediate step to create a contrast enhanced version of the grey value image. Such an operator has for example been described in European patent EP 527 525. The modification is defined by a conversion function or as a multiplicative amplification.

Amplification Image

We can define an amplification image $a_k$ in case the conversion operator is defined as a multiplicative amplification:

$$d_{k\ out}(i,j) = a_k(i,j) d_k(i,j)$$

Wherein $d_{k\ out}(i,j)$ is the modified detail image pixel value, $d_k(i,j)$ is the detail image pixel value and $a_k(i,j)$ is the amplification image value.

Iterative Method

The processing of the image could be done in an iterative way. First, for instance, the local variance of translation difference image pixel value is used to calculate the amplification image values ($a_k(i,j)$):

$$\mathrm{var}_{k,it}(i,j) => a_{k,it}(i,j)$$

Next, detail image pixels are modified by the amplification image:

$$d_{k,it+1}(i,j) = a_{k,it}(i,j) d_{k,it}(i,j)$$

we can calculate a new approximation image based on the modified detail images. Next, local variance of translation difference image pixel value for this modified approximation image can be calculated.

The new local variance of translation difference image pixel value can then be used to modify the modified detail image again. This process could be repeated multiple times.

In order to calculate $\mathrm{var}_{k,it+1}(i,j)$ one could also use Taylor expansions approximation for the moments of functions of random variables:

$$\mathrm{var}_{k,it+1} \sim (a_{k,it}(i,j))^2 \mathrm{var}_{k,it}(i,j)$$

The present invention is generally implemented as a computer program product adapted to carry out the method of any of the claims when run on a computer and is stored on a computer readable medium. The methods of the present invention can be applied for enhancing the image quality of medical images such as mammographic images, images obtained by computed tomography etc.

Further advantages and embodiments of the present invention will become apparent from the following description and drawings.

BRIEF DESCRIPTION OF DRAWINGS

FIG. 1: Represents a comparison of the contrast enhancement results of the algorithm according to Mei et al 2002, and the method of this invention. The graph comprising "•" (dot-)symbols is the former method, while the graph comprising the "+" (plus-)symbols represents the enhancement result based on the method of the invention. It can be easily seen that the latter method produces less overshoot in areas with sharp edges (such as for instance around pixel 15 in the graph).

DESCRIPTION OF EMBODIMENTS

The contrast enhancement algorithm of the present invention is applicable to all multi-scale detail representation methods from which the original image can be computed by applying the inverse transformation. Preferably the multi scale representation has a pyramidal structure such that the number of pixels in each detail image decreases at each coarser resolution level.

State-of-the-art multi-scale algorithms decompose an image into a multi-scale representation comprising detail images representing detail at multiple scales and a residual image. Some of the important multi-scale decompositions are the wavelet decomposition, the Laplacian-of-Gaussians (or LoG decomposition), the Difference-of-Gaussians (or DoG) decomposition and the Burt pyramid.

The wavelet decomposition is computed by applying a cascade of high-pass and low-pass filters followed by a subsampling step. The high-pass filter extracts the detail information out of an approximation image at a specific scale. In the Burt pyramid decomposition, the detail information is extracted out of an approximation image at scale k by subtracting the upsampled version of the approximation image at scale k+1.

In a state of the art methods as the one disclosed in EP 527 525 a contrast enhanced version of the image is created by conversion of the pixel values in the detail images followed by multi-scale reconstruction. All above implementations of multiscale decomposition have a common property. Each pixel value in the detail images can be computed out of an approximation image by combining the pixel values in a moving neighbourhood.

In the above cases the combining function is a weighted sum. For the wavelet decomposition the pixel values in the detail image at scale k are computed as:

$$d_{k+1} = \downarrow(h_d * g_k)$$

$$g_{k+1} = \downarrow(l_d * g_k)$$

with $h_d$ a high-pass filter, $l_d$ a low-pass filter, * the convolution operator and $\downarrow$ the subsampling operator (i.e. leaving out every second row and column).

For the wavelet reconstruction the contrast enhanced approximation image at scale k is computed as:

$$h_k = l_r * (\uparrow h_{k+1}) + h_r * (\uparrow f_k(d_k(i,j), \mathrm{var}_k(i,j)))$$

with $h_r$ a high-pass filter, $l_r$ a low-pass filter and $\uparrow$ the upsampling operator (i.e. inserting pixels with value 0 in between any two rows and columns).

For the Burt decomposition the pixel values in the detail image at scale k are computed as:

$$d_k = g_k - 4g * (\uparrow g_{k+1})$$

or $$d_k = g_k - 4g * (\uparrow(\downarrow(g * g_k)))$$

or $$d_k = (1 - 4g * (\uparrow(\downarrow g))) * g_k$$

with g a Gaussian low-pass filter and 1 the identity operator.

For the Burt reconstruction the contrast enhanced approximation image at scale k is computed as:

$$h_k = 4g * (\uparrow h_{k+1}) + f_k(d_k(i,j), \mathrm{var}_k(i,j))$$

with $f_k(d_k(i,j), \mathrm{var}_k(i,j))$ the conversion operator.

The multi-scale detail pixel values as weighted sums.

Suppose that in the Burt multi-scale decomposition a 5×5 Gaussian filter is used with coefficients $w_{k,l}$ with k=−2, ..., 2 and l=−2, ..., 2 the subsampling operator removes every second row and column and the upsampling operator inserts pixels with value 0 in between any two rows and columns.

The pixel at position i,j in the approximation image $g_{k+1}$ is computed as:

$$g_{k+1}(i, j) = \sum_{s=-2}^{2} \sum_{t=-2}^{2} w_{s,t} g_k(2i+s, 2j+t)$$

The pixel at position i,j in the upsampled image $u_k$ is computed as:

$$u_k(i, j) = \begin{cases} \sum_{s=-2}^{2} \sum_{t=-2}^{2} w_{s,t} g_k(i+s, j+t), & \text{if } i \text{ and } j \text{ are even} \\ 0 & \text{if } i \text{ and } j \text{ are note even} \end{cases}$$

The pixel at position i,j in the upsampled, smoothed image $gu_k$ is computed as:

$$gu_k(i, j) = \begin{cases} \sum_{m=\{-2,0,2\}} \sum_{n=\{-2,0,2\}} w_{m,n} \sum_{s=-2}^{2} \sum_{t=-2}^{2} w_{s,t} g_k(i+s+m, j+t+n), \text{if } i \text{ and } j \text{ are even} \\ \sum_{m=\{-1,1\}} \sum_{n=\{-2,0,2\}} w_{m,n} \sum_{s=-2}^{2} \sum_{t=-2}^{2} w_{s,t} g_k(i+s+m, j+t+n), \text{if } i \text{ is odd and } j \text{ is even} \\ \sum_{m=\{-2,0,2\}} \sum_{n=\{-1,1\}} w_{m,n} \sum_{s=-2}^{2} \sum_{t=-2}^{2} w_{s,t} g_k(i+s+m, j+t+n), \text{if } i \text{ is even and } j \text{ is odd} \\ \sum_{m=\{-1,1\}} \sum_{n=\{-1,1\}} w_{m,n} \sum_{s=-2}^{2} \sum_{t=-2}^{2} w_{s,t} g_k(i+s+m, j+t+n), \text{if } i \text{ and } j \text{ are odd} \end{cases}$$

Finally, the pixel at position i,j in the detail image $d_k$ is computed as:

$$d_k(i, j) = \begin{cases} g_k(i, j) - 4 \sum_{m=\{-2,0,2\}} \sum_{n=\{-2,0,2\}} w_{m,n} \sum_{s=-2}^{2} \sum_{t=-2}^{2} w_{s,t} g_k(i+s+m, j+t+n), \\ \qquad \text{if } i \text{ and } j \text{ are even} \\ g_k(i, j) - 4 \sum_{m=\{-1,1\}} \sum_{n=\{-2,0,2\}} w_{m,n} \sum_{s=-2}^{2} \sum_{t=-2}^{2} w_{s,t} g_k(i+s+m, j+t+n), \\ \qquad \text{if } i \text{ is odd and } j \text{ is even} \\ g_k(i, j) - 4 \sum_{m=\{-2,0,2\}} \sum_{n=\{-1,1\}} w_{m,n} \sum_{s=-2}^{2} \sum_{t=-2}^{2} w_{s,t} g_k(i+s+m, j+t+n), \\ \qquad \text{if } i \text{ is even and } j \text{ is odd} \\ g_k(i, j) - 4 \sum_{m=\{-1,1\}} \sum_{n=\{-1,1\}} w_{m,n} \sum_{s=-2}^{2} \sum_{t=-2}^{2} w_{s,t} g_k(i+s+m, j+t+n), \\ \qquad \text{if } i \text{ and } j \text{ are odd} \end{cases}$$

Generally, the pixel at position i,j in the detail image $d_k$ can be computed as a weighted sum of pixels in the approximation image at the same or smaller scale k,k−1, k−2, ... :

$$d_k(i, j) = g_l(ri, rj) - \sum_{m} \sum_{n} v_{m,n} g_l(ri+m, rj+n)$$

with $l \in \{0, \ldots, k\}$ and r=subsampling_factor$^{(l-k)}$
Because, $$\sum_{m} \sum_{n} v_{m,n} = 1$$

the pixel at position i,j in the detail image $d_k$ can be computed as:

$$d_k(i, j) = g_l(ri, rj) - \sum_{m} \sum_{n} v_{m,n} g_l(ri+m, rj+n)$$

$$d_k(i, j) = \sum_{m} \sum_{n} v_{m,n} g_l(ri, rj) - \sum_{m} \sum_{n} v_{m,n} g_l(ri+m, rj+n)$$

$$d_k(i, j) = c_k(i, j) = \sum_{m} \sum_{n} v_{m,n} (g_l(ri, rj) - g_l(ri+m, rj+n))$$

The term $(g_l(ri,rj)-g_l(ri+m,rj+n))$ is called the translation difference. It expresses the difference in pixel value between a central pixel and a neighbouring pixel in an approximation image. It is a measure of local contrast. The weighted sum of the translation differences is called a centre difference $c_k(i,j)$. The weights can be chosen such that the center difference images are identical to the multi-scale detail images or that they are a close approximation of the multi-scale detail images. In a similar way as disclosed higher, it can be proven that the detail images in other multi-scale decomposition methods can also be represented as a combination of translation difference images.

According to a specific embodiment of this method, the center difference image may be computed by applying a linear function as a combining operator to the translation difference images. An example of such a linear function is $$\sum_{m} \sum_{n} v_{m,n}(g_l(ri, rj) - g_l(ri+m, rj+n))$$

such that this equation equals the detail image itself on condition that:

$$\sum_{m} \sum_{n} v_{m,n} = 1$$

In one embodiment, the statistical measure of translation difference image pixel value can be calculated as the local variance of translation difference image pixel value. One way to calculate this, is by applying a squaring operator as a combinina operator to the translation difference images:

$$var_k = \sum_m \sum_n v_{m,n}(g_l(ri, rj) - g_l(ri+m, rj+n))^2$$

A correct way to define variance is as the second central moment of a distribution or the expectation of the squared deviation of a random variable from its mean.

And thus, in another embodiment, the local variance of the translation difference image pixel value is computed as the weighted average of the squared difference of the translation difference image and the weighted average of the translation difference around each pixel of interest:

$$var_k(i, j) = \sum_m \sum_n v_{m,n}\left(g_l(ri, rj) - g_l(ri+m, rj+n) - \sum_m \sum_n v_{m,n}(g_l(ri, rj) - g_l(ri+m, rj+n))\right)^2$$

Or since $d_k(ri,rj)=\Sigma_m\Sigma_n v_{m,n}(g_l(ri,rj)-g_l(ri+m,rj+n))$, the local variance of translation difference image pixel value can also be computed as the weighted average of the squared difference of the translation difference image and the detail image around each pixel of interest:

$$var_k(i, j) = \sum_m \sum_n v_{m,n}(g_l(ri, rj) - g_l(ri+m, rj+n) - d_k(ri, rj))^2$$

or in case that $$\sum_m \sum_n v_{m,n} = 1$$

then $var_k(i, j) = -d_k^2 + \sum_m \sum_n v_{m,n}(g_l(ri, rj) - g_l(ri+m, rj+n))^2$ It has to be noted that the variance of the approximation image, as used in Mei et al. 2002 is defined differently as follows:

$$var_k(i, j) = \sum_m \sum_n v_{m,n}\left(g_l(ri+m, rj+n) - \sum_m \sum_n v_{m,n}(g_l(ri+m, rj+n))\right)^2$$

As an example of an N×N neighbourhood, a 3×3 neighbourhood has to be understood as a surface of 3×3 image pixels around a central pixel, such that m and n are both {−1,0,1} and $$v_{m,n} = \frac{1}{9}$$

for the mathematical notations above. $v_{m,n}$ can also have Gaussian weights.

In another embodiment the statistical measure of translation difference image pixel value could also be defined with higher central moments. Such as for instance the $2^{nd}$ central moment: variance (see above), or also the $3^{rd}$ central moment, skewness:

$$skew_k(i, j) = \sum_m \sum_n v_{m,n}\left(g_l(ri, rj) - g_l(ri+m, rj+n) - \sum_m \sum_n v_{m,n}(g_l(ri, rj) - g_l(ri+m, rj+n))\right)^3$$

Or the $4^{th}$ central moment, kurtosis:

$$kurtosis_k(i, j) = \sum_m \sum_n v_{m,n}\left(g_l(ri, rj) - g_l(ri+m, rj+n) - \sum_m \sum_n v_{m,n}(g_l(ri, rj) - g_l(ri+m, rj+n))\right)^4$$

In another embodiment, the statistical measure can also be any combination of different statistical measures.

In another embodiment, the statistical measure of the translation difference image pixel value is not computed with an average operator, but as a predetermined percentile.

As example, this predetermined percentile may be defined as taking the maximum (or as the 100% percentile):

$$var_k(i, j) = \max_{m,n}(g_l(ri, rj) - g_l(ri+m, rj+n) - d_k(ri, rj))^2$$

Alternatively, other percentile values may be considered; instead of using the maximum (=100% percentile), a different percentile value can be taken such as for instance the median (50%) or 95%-percentile.

In another embodiment, other values for statistical dispersion of the translation difference image pixel value can be taken. For instance, the difference of a first predetermined percentile value and a second predetermined percentile value of the translation difference image pixel values within a neighborhood. As an example, we can take the range of translation difference image pixel value around a pixel, where the first predetermined percentile is the maximum, and the second predetermined percentile the minimum:

$$\max_{m,n}(g_l(ri, rj) - g_l(ri+m, rj+n)) - \min_{m,n}(g_l(ri, rj) - g_l(ri+m, rj+n))$$

Another example is the interquartile range.

Conversion Operator

A statistical measure of translation difference image pixel value for at least one approximation image pixel within a neighbourhood of pixel and the value of the detail image pixel itself are used to modify the detail image pixel in order to obtain a processed detail image in such a way, that after reconstruction the contrast in the image is enhanced. As explained above, the term "statistical measure of translation difference image pixel value" means "any mathematical operation on translation difference image pixel value in a neighbourhood of a local approximation image pixel". As explained above, this mathematical operation may for instance be based on the calculation of a local variance in an N×N neighbourhood.

The resulting statistical measure of translation difference image pixel value and the value of the detail image pixel are then used to modify the detail image pixel value in order to obtain a processed detail image in such a way, that after reconstruction contrast is enhanced.

This could be done with a function $f_k$ that is a function of the statistical measure $\mathrm{var}_k(i,j)$ and the detail image pixel value $d_k(i,j)$, itself:

$$d_{k\ out}(i,j) = f_k(d_k(i,j), \mathrm{var}_k(i,j))$$

Where $d_{k\ out}(i,j)$ is the resulting detail image pixel value.

In one embodiment, $f_k$ is a non-linear function of the statistical measure of translation difference image pixel value and the detail image pixel.

Conversion could also be applied with a multiplicative amplification image $a_k$:

$$d_{k\ out}(i,j) = a_k(i,j) d_k(i,j)$$

In one embodiment, $a_k(i,j)$ is a function of the statistical measure translation difference image pixel value:

$$a_k(i,j) = f_k(\mathrm{var}_k(i,j))$$

Typically, $f_k$ is non-linear in order to obtain contrast enhancement in the reconstructed image.

In one specific embodiment the amplification image can be defined as:

$$a_k(i,j) = \frac{f_k(\sqrt{var_k(i,j)})}{\sqrt{var_k(i,j)}}$$

Wherein $\mathrm{var}_k(i,j)$ is the local variance of translation difference image and mapping function $f_k$ is defined as for instance illustrated in EP 527 525, p 9.35:

$$f_k : x \to a\, x^p$$

In this embodiment x will be $\sqrt{\mathrm{var}_k(i,j)}$ (rather than being defined as the detail image pixel as in EP 527 525), As such:

$$a_k(i,j) = \alpha \frac{\sqrt{var_k(i,j)}^p}{\sqrt{var_k(i,j)}} = \alpha \sqrt{var_k(i,j)}^{p-1}$$

where the power p is chosen within the interval $0 < p < 1$, preferably within the interval $0.5 < p < 0.9$. A comparative evaluation of a large number of computed radiography images of thorax and bones by a team of radiologists indicated that $p=0.7$ is the optimal value in most cases. a specifies a gain factor.

If this multiplicative amplification factor is applied to a detail image, then all details with a low variance of translation difference images (or elementary contrast) will be boosted relative to the image details which originally have a higher local variance.

In this respect, the above power function $f_k : x \to a\, x^p$ proved to perform very well, but it is clear that an infinite variety of monotonically increasing mapping functions can be found that will enhance subtle details with low variance. The main requirement is that $a_k(i,j)$ is higher, and thus the slope of said mapping function is steeper, in the region of argument values that correspond to low elementary contrast.

In an alternative embodiment, excessive noise amplification can be avoided by using a composite mapping function:

$$f_k : x \to \alpha c^{p_2}\left(\frac{x}{c}\right)^{p_1} \text{ if } x < c$$

$$x \to \alpha x^{p_2} \text{ if } x \geq c$$

where the power $p_2$ is chosen in the interval $0 < p_2 < 1$, preferably $0.5 < p_2 < 0.9$, and most preferably $p_2 = 0.7$ (however the preferred value of $p_2$ highly depends upon the exact kind of radiological examination, and may vary). The power $p_1$ in this equation should not be smaller than $p_2$: $p_1 \geq p_2$, where the cross-over abscissa c specifies the transition point between both power functions.

Decreasing the power $p_2$ will further enhance the contrast of subtle details, but at the same time the noise component will also be amplified. The noise amplification can be limited by choosing a power value $p_1$ larger than $p_2$, preferably 1.0, so that the slope of the mapping function is not extremely steep for the range of very small abscissae.

Ideally the cross-over abscissa c should be proportional to the standard deviation of the noise component (assuming additive noise), so the lowest amplitude details buried within the noise along with the majority of the noise signals will only be moderately amplified, according to the slope of the functional part controlled by the power $p_1$, while the detail signals just exceeding the noise level will be amplified much more according to the slope of the functional part controlled by the power $p_2$. The decreasing slope of the latter functional part still assures that the subtle details above the noise level are boosted relative to the high amplitude details. In this respect, the above composite power function proved to perform very well, but it is clear that an infinite variety of monotonically increasing mapping functions can be found that will enhance subtle details without boosting the noise to an excessive level.

The main requirement is that $a_k(i,j)$ is higher, and thus the slope of said mapping function is steeper, in the region of argument values that correspond to low elementary contrast than it is either in the sub-range of very small elementary contrast which mostly correspond to noise, or in the range of the larger elementary contrast.

When all detail images of the decomposition are modified using the same mapping according to one of the above methods, a uniform enhancement over all scales will be obtained. In a slightly modified embodiment, where a different mapping function is used at each resolution level e.g. by multiplying one of the above described mapping functions or multiplicative factor with a resolution level-dependent coefficient, it is possible to further increase the sharpness by setting the coefficient corresponding to the finest resolution level to a substantially higher value than the other coefficients as follows:

$$y = A_i F(x)$$

$$\text{for } i = 0 \ldots L-1$$

where $F(x)$ is one of the above described mappings, L is the number of resolution levels, and $A_i$ is a level dependent coefficient, e.g. $A_0 > 1$, and $A_i < 1$ for $1 \leq i \leq L-1$.

The detail images are modified starting from the lowest resolution detail image up to the finest level, which is the order in which they are needed in the course of the reconstruction process.

Subsequently, the reconstruction algorithm is applied to the modified detail images $d_{k\ out}$.

In addition, other enhancements may be applied to $d_k$ prior or after the application of the conversion operator $a_k(i,j)$.

The above-mentioned aspects are realized by a method, an apparatus, computer program product, and computer readable medium as defined in the appending claims which define the invention. Specific and preferred embodiments of this invention are set out in the dependent claims.

The following apparatus may be considered an example of the invention: an apparatus for enhancing the contrast in an electronic representation of an image comprising:
   means for decomposing said electronic representation into a set of detail images at multiple resolution levels and a residual image at a resolution level lower than the minimum of said multiple resolution levels,
   means for processing at least one pixel of said detail images, means for computing a processed image by applying a reconstruction algorithm to the residual image and the processed detail images, said reconstruction algorithm being such that if it were applied to the residual image and the detail images without processing, then said electronic image or a close approximation thereof would be obtained, characterised in that said apparatus comprises means for storing said detail images, and wherein said means for processing said detail images, comprises:

means for calculating for said pixel, at least one statistical measure for two or more translation difference image pixel values within a neighborhood of said pixel, means for modifying the value of said pixel of said detail images as a function of said statistical measure and said value of said pixel of said detail images.

The invention claimed is:

1. A computer-implemented method for enhancing the contrast of an electronic representation of an original image represented by an array of pixel values by processing said image, said processing comprising the steps of:
   a) decomposing said electronic representation into a set of detail images at multiple resolution levels and a residual image at a resolution level lower than said multiple resolution levels,
   b) processing at least one pixel of said detail images, and
   c) computing a processed image by applying a reconstruction algorithm to the residual image and the processed detail images, said reconstruction algorithm being such that if it were applied to the residual image and the detail images without processing, then said electronic representation or a close approximation thereof would be obtained,
   characterized in that said processing comprises the steps of:
   d) calculating for said pixel, at least one statistical measure that is computed as a central moment of two or more translation difference image pixel values within a neighborhood of said pixel, or as any combination of said central moments; wherein said translation difference image pixel value expresses the difference in pixel value between a central pixel and a neighboring pixel in an approximation image, and
   e) applying a function of said statistical measure and said value of said pixel of said detail images to obtain the value of said pixel of said detail images.

2. The computer-implemented method of claim 1, wherein said statistical measure is computed as a statistical dispersion of two or more translation difference image pixel values within a neighborhood of said pixel.

3. The computer-implemented method of claim 1, wherein said statistical measure is computed as the local variance of two or more translation difference image pixel values within a neighborhood of said pixel.

4. The computer-implemented method of claim 1, wherein said statistical measure is computed as the weighted average of the squared differences between translation difference image pixel values and the detail image pixel value.

5. The computer-implemented method of claim 1, wherein said statistical measure is computed as the weighted average of the squared differences between translation difference image pixel values and the detail image pixel value, wherein said detail image pixel value is computed as the weighted average of the translation difference image pixel values.

6. The computer-implemented method of claim 1, wherein said statistical measure is computed as the difference of a first predetermined percentile value and a second predetermined percentile value of translation difference image pixel values within a neighborhood of said pixel.

7. The computer-implemented method of claim 6, wherein said difference of a first predetermined percentile value and a second predetermined percentile value for said pixel is defined as the interquartile range within a neighborhood of said pixel.

8. The computer-implemented method of claim 1, wherein said statistical measure is computed as a predetermined percentile of the squared differences between translation difference image pixel values and the said detail image pixel value within a neighborhood of said pixel.

9. The computer-implemented method of claim 1, wherein said modifying is defined as a non-linear function of said statistical measure and said value of said pixel of said detail images.

10. The computer-implemented method of claim 1, wherein said modifying value of said pixel of said detail images is defined as a product of an amplification image ($a_k$) and detail image:

$$d_{k\ out}(i,j) = a_k(i,j) d_k(i,j)$$

wherein $d_{k\ out}(i,j)$ is the modified detail image pixel value, $d_k(i,j)$ is the detail image pixel value and $a_k(i,j)$ is the amplification image pixel value.

11. The computer-implemented method of claim 10, wherein amplification image pixel value is a function of at least one said statistical measure.

12. The computer-implemented method of claim 10, wherein amplification image is defined as:

$$a_k(i, j) = \frac{f_k(\sqrt{var_k(i, j)})}{\sqrt{var_k(i, j)}}$$

wherein $var_k$ is the local variance of at least one translation difference image pixel value within a neighborhood of said pixel.

13. The computer-implemented method of claim 12, wherein $f_k$ is a non-linear monotonically increasing conversion function with a slope that gradually decreases with increasing argument values.

14. The computer-implemented method of claim 1, wherein processing at least one pixel of said detail images is repeated at least one time for already processed detail image pixels.

15. An apparatus for enhancing the contrast in an electronic representation of an image comprising:
   a computer processor for decomposing said electronic representation into a set of detail images at multiple resolution levels and a residual image at a resolution level lower than the minimum of said multiple resolution levels,
   means for processing at least one pixel of said detail images, and
   means for computing a processed image by applying a reconstruction algorithm to the residual image and the processed detail images, said reconstruction algorithm being such that if it were applied to the residual image and the detail images without processing, then said electronic image or a close approximation thereof would be obtained,
   characterized in that said apparatus comprises:
   means for storing said detail images, and
   wherein said means for processing said detail images comprises:
   means for calculating for said pixel, at least one statistical measure that is computed as a central moment of two or more translation difference image pixel values within a neighborhood of said pixel, or as any combination of said central moments, wherein said translation difference image pixel value expresses the difference in pixel value between a central pixel and a neighboring pixel in an approximation image, and means for applying a function of said statistical measure and said value of said pixel of said detail images to obtain the value of said pixel of said detail images.

16. A computer-implemented method for enhancing the contrast of an electronic representation of an original image represented by an array of pixel values by processing said image, said processing comprising the steps of:
  a) decomposing said electronic representation into a set of detail images at multiple resolution levels, said detail images being the difference between an image at a certain scale and at a smaller scale, and a residual image at a resolution level lower than said multiple resolution levels,
  b) processing at least one pixel of said detail images, and
  c) computing a processed image by applying a reconstruction algorithm to the residual image and the processed detail images, said reconstruction algorithm being such that if it were applied to the residual image and the detail images without processing, then said electronic representation would be obtained,
  characterized in that said processing comprises the steps of:
  d) performing for said at least one pixel of said detail images, a mathematical operation to calculate a statistical measure $var_k(i,j)$ on the translation difference image pixel value in a neighborhood of an approximation image pixel,
    wherein an approximation image pixel represents the original grey value image at the same or a larger scale, or at the same or a lower resolution,
    and wherein a translation difference image pixel value is defined as the result of a comparison between an approximation image pixel $g_l(ri,rj)$ and another approximate image pixel $g_l(ri+m,rj+n)$ expressed by $g_l(ri,rj)-g_l(ri+m,rj+n)$, and
  e) modifying the value of said detail image pixel value $d_k(i,j)$ to obtain a modified detail image pixel value $d_{k\ out}(i,j)$ by applying a function $f_k$ of said statistical measure $var_k(i,j)$ and said image detail pixel value $d_k(i,j)$ such that:

$$d_{k\ out}(i,j)=a_k(i,j)d_k(i,j) \text{ and } a_k(i,j)=f_k(var_k(i,j))$$

wherein $a_k(i,j)$ is an amplification image pixel value and $f_k$ is a non-linear function with a steeper slope in the region of argument values that correspond to low contrast than in other regions.

17. The computer-implemented method of claim 16, wherein said statistical measure is computed as a statistical dispersion of two or more translation difference image pixel values within a neighborhood of said pixel.

18. The computer-implemented method of claim 16, wherein said statistical measure is computed as the local variance of two or more translation difference image pixel values within a neighborhood of said pixel.

19. The computer-implemented method of claim 16, wherein said statistical measure is computed as the weighted average of the squared differences between translation difference image pixel values and the detail image pixel value.

20. The computer-implemented method of claim 16, wherein said statistical measure is computed as the weighted average of the squared differences between translation difference image pixel values and the detail image pixel value, wherein said detail image pixel value is computed as the weighted average of the translation difference image pixel values.

* * * * *